United States Patent

Holtan

(10) Patent No.: US 10,672,035 B1
(45) Date of Patent: Jun. 2, 2020

(54) SYSTEMS AND METHODS FOR OPTIMIZING ADVERTISING SPENDING USING A USER INFLUENCED ADVERTISEMENT POLICY

(71) Applicant: Oath (Americas) Inc., Dulles, VA (US)

(72) Inventor: Hans Marius Holtan, San Jose, CA (US)

(73) Assignee: Verizon Media Inc., New York, NY (US)

( * ) Notice: Subject to any disclaimer, the term of this patent is extended or adjusted under 35 U.S.C. 154(b) by 128 days.

(21) Appl. No.: 13/837,385

(22) Filed: Mar. 15, 2013

(51) Int. Cl.
*G06Q 30/02* (2012.01)

(52) U.S. Cl.
CPC ..... *G06Q 30/0275* (2013.01); *G06Q 30/0244* (2013.01); *G06Q 30/0251* (2013.01); *G06Q 30/0277* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 8,117,066 B1* | 2/2012 | Walcott et al. | 705/14.41 |
| 2003/0033190 A1* | 2/2003 | Shan et al. | 705/10 |
| 2006/0026064 A1* | 2/2006 | Collins | 705/14 |
| 2008/0103897 A1* | 5/2008 | Flake et al. | 705/14 |
| 2008/0281694 A1* | 11/2008 | Kretz et al. | 705/14 |
| 2009/0030746 A1* | 1/2009 | Etzioni et al. | 705/5 |
| 2009/0037317 A1* | 2/2009 | Zhou | G06Q 30/0244 705/37 |
| 2012/0042253 A1* | 2/2012 | Priyadarshan et al. | 715/733 |
| 2014/0046753 A1* | 2/2014 | Rabii et al. | 705/14.41 |

OTHER PUBLICATIONS

Subasic et al., U.S. Appl. No. 12/558,891, filed Sep. 14, 2009, and entitled "Systems and Methods for Online User Profiling and Segmentation" (39 pages).
Qu et al., U.S. Appl. No. 12/775,826, filed May 7, 2010, and entitled "Systems and Methods for Generating Expanded User Segments" (47 pages).

\* cited by examiner

Primary Examiner — Vincent M Cao
(74) Attorney, Agent, or Firm — Bookoff McAndrews, PLLC

(57) ABSTRACT

Systems and methods are disclosed for generating an optimized bid value for an advertisement relating to a product. In one implementation, a computerized-method is provided for receiving information about online activity by a plurality of users, the information including a user ID associated with each of the plurality of users. The method may also include extracting a feature set corresponding to purchasing users, the purchasing users being a subset of the plurality of users who have purchased the product. The method may further include generating a model that represents the extracted feature sets of the purchasing users, based on the extracted data, calculating a reward function according to the generated model, and generating an optimized bid value for the advertisement according to the calculated reward function, the optimized bid value representing the difference between a value of displaying the advertisement, and a value of not displaying the advertisement.

18 Claims, 4 Drawing Sheets

US 10,672,035 B1

SYSTEMS AND METHODS FOR OPTIMIZING ADVERTISING SPENDING USING A USER INFLUENCED ADVERTISEMENT POLICY

BACKGROUND

Technical Field

The present disclosure generally relates to the field of data processing and online advertising. More specifically, and without limitation, the present disclosure relates to computerized systems and methods for optimizing advertising spending using, for example, a user-influenced advertising policy.

Background

As greater numbers of people use the Internet for communication, commerce, and other daily activities, larger and larger volumes of traffic are generated for accessing content on the Internet. Because the benefits of commercializing the Internet can be tremendous, businesses increasingly take advantage of this traffic by advertising various products or services online. These advertisements may appear in leased advertising space (e.g., "banners") on content websites, which are operated by "publishers" who control the website content and the availability and cost of the advertising space or "ad inventory."

Advertisers may create online advertising campaigns that include advertisements designed to be placed on content websites during a specified period of time. For example, an automobile company may design several advertisements for a new model and may wish to have the advertisements placed online during a period surrounding the launch of the new model. Each time an advertisement is shown to a viewer of the website it is known as an "impression." After an advertisement is shown, a user may select, or "click," on the advertisement or may take another "action" such as completing an online form to request more information. If the user purchases the new model of automobile, the purchase is referred to as a "conversion" of the impression.

Based on the collection of data regarding specific impressions, clicks, or conversions, an advertiser may optimize ad placement by attempting to determine behavior of a particular user, and can then spend money only on users having certain demographics or personal interests. Therefore, advertisers may wish to obtain very specific information about the types of consumers viewing various types of websites and responding to advertisements. In some cases, advertisers may be willing to spend more money per impression, click, action, or conversion based on known information about those users interacting with the advertisements. As a result, publishers of content websites and/or facilitators of third party advertising networks may wish to obtain as much information as possible about consumers and other users traveling between web pages associated with an advertising network.

SUMMARY

Consistent with embodiments of the present disclosure, improved systems and methods are provided for online advertising. Among other features and advantages, the disclosed embodiments perform online user profiling, and optimize the selection of advertisements according to functions describing the likelihood of future purchases based on the advertisements.

In accordance with some embodiments, a computer-implemented method is provided for generating an optimized bid value for an advertisement relating to a product. The method may include receiving information about online activity by a plurality of users, the information including a user ID associated with each of the plurality of users. The method may also include extracting a feature set corresponding to purchasing users, the purchasing users being a subset of the plurality of users who have purchased the product. The method may further include generating a model that represents the extracted feature sets of the purchasing users, based on the extracted data, calculating a reward function according to the generated model, and generating an optimized bid value for the advertisement according to the calculated reward function, the optimized bid value representing the difference between a value of displaying the advertisement, and a value of not displaying the advertisement.

In accordance with other embodiments, a system is provided for generating an optimized bid value relating to a product. The system may include a computer-readable storage medium that stores a set of instructions. The system may further include at least one processor configured to execute the stored set of instructions to cause the processor to receive information about online activity by a plurality of users, the information including a user ID associated with each of the plurality of users, and extract a feature set corresponding to purchasing users, the purchasing users being a subset of the plurality of users who have purchased the product. In addition, the set of instructions may cause the processor to generate a model that represents the extracted feature sets of the purchasing users, based on the extracted data, calculate a reward function according to the generated model, and generate an optimized bid value for the advertisement according to the calculated reward function, the optimized bid value representing the difference between a value of displaying the advertisement, and a value of not displaying the advertisement.

In accordance with still further embodiments, a computer-readable storage medium is provided. The computer-readable storage medium may store a set of instructions that are executable by at least one processor to cause the at least one processor to perform a method for generating an optimized bid value for an advertisement relating to a product. The method may include receiving information about online activity by a plurality of users, the information including a user ID associated with each of the plurality of users. The method may also include extracting a feature set corresponding to purchasing users, the purchasing users being a subset of the plurality of users who have purchased the product. The method may further include generating a model that represents the extracted feature sets of the purchasing users, based on the extracted data, calculating a reward function according to the generated model, and generating an optimized bid value for the advertisement according to the calculated reward function, the optimized bid value representing the difference between a value of displaying the advertisement, and a value of not displaying the advertisement.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION OF EXEMPLARY EMBODIMENTS

Figure 1:
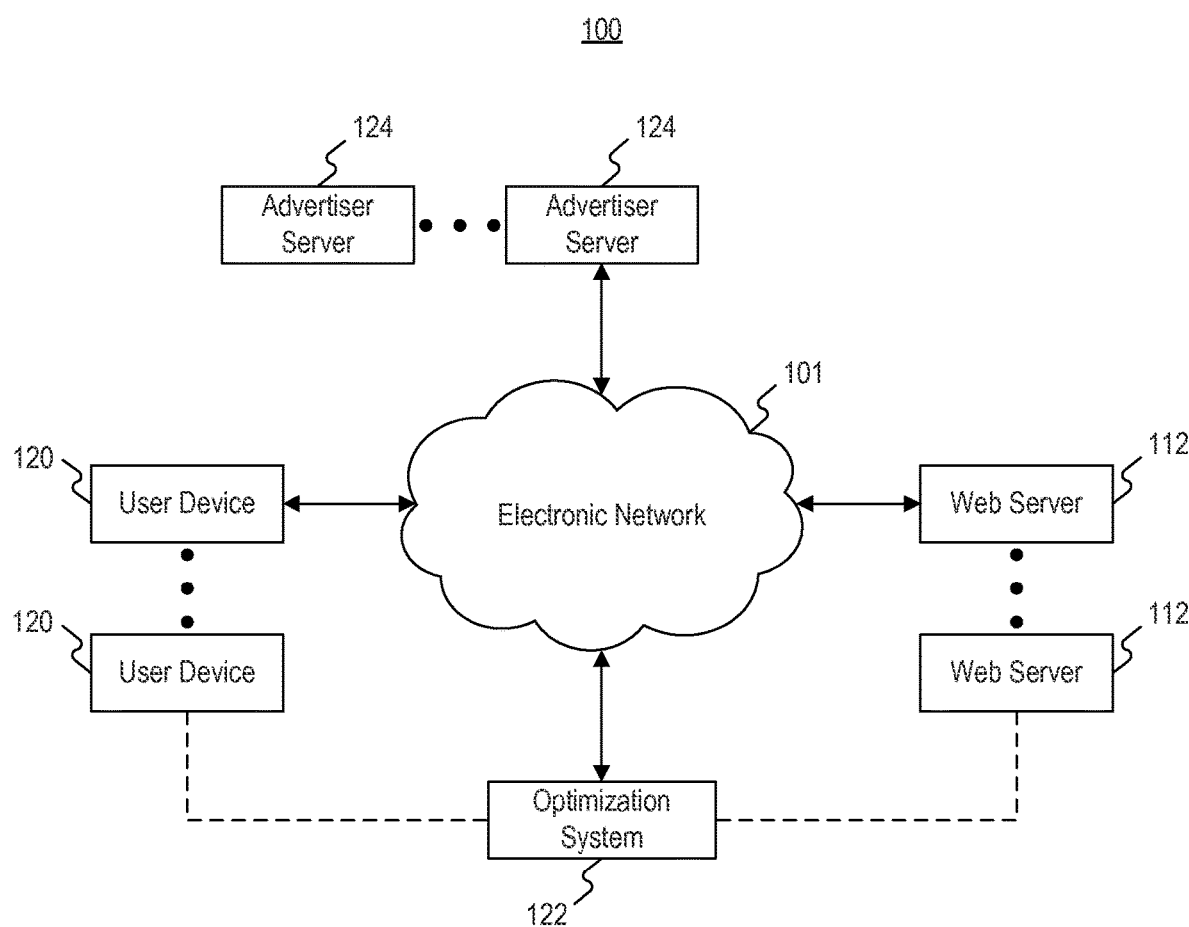
FIG. 1 is a diagram of an exemplary computerized system 100 for implementing embodiments consistent with the present disclosure.

Reference will now be made in detail to exemplary embodiments implemented according to the present disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Conventional advertising systems and methods generally rely on predicting future advertising needs based on analyzing advertisement placement data, and inferring future behavior from the advertisement placement data. Furthermore, the inference of future behavior has traditionally been based on past behavior of large groups of users, such as specific conversions of an advertisement, and has not been able to take into account attributes or features of an individual user, or how ads may impact the individual user's behavior. Therefore, making individual user predictions has been difficult, and advertising systems have not been able to accurately optimize advertisement placement. Furthermore, existing systems have not been able to analyze, based on an individual user's features, whether an advertisement is necessarily influencing the behavior of the individual user, and whether it is even beneficial to display an advertisement given an individual user's features.

In contrast, systems and methods consistent with the present disclosure enable the capturing of user data on an individual level, such as by capturing information about what actions users are taking online, as well as specific features of the individual user, such as what the user's interests are, and what content the user has viewed in the past. The captured user data can then be used to build user profiles, which can be analyzed to create models. Based on these models and a defined set of features, advertisers can estimate whether an advertisement is likely to influence the behavior of a user having certain features, and can appropriately determine an optimal bid value for use in bidding for advertisement space.

The disclosed embodiments can be used for advertisement and content optimization, product recommendations, or the like in an electronic network, such as the Internet. In accordance with certain embodiments, an optimization algorithm is provided for adaptively exploring and exploiting a dynamic network of advertisements, product recommendations ("promotions" or "messages"), or the like. Using past historical data as estimates for engagement data (e.g., click-through-rate ("CTR"), interaction with an interactive piece of content, time spent viewing content, pre-views of product offerings, ad conversions, ad revenue, purchase of e-commerce products, etc.), embodiments of the present disclosure may enable continuous and economic learning and re-learning of engagement probability for a set of promotions, and may predict future behaviors to optimize appropriate advertisement placement.

In accordance with certain embodiments, a continually-refined bid optimization system may be used in a market clearing or auction setting. By modeling a base bid price according to a baseline distribution model, optimizations can be performed on the base bid value according to features of individual users, and advertisers can bid for promotion slots on a web page or other medium with the optimized bid values. The winning promotion for each promotion slot can be displayed in that promotion slot for viewing and interaction by users.

FIG. 1 illustrates an exemplary computerized system 100 for implementing embodiments consistent with the present disclosure. As shown in FIG. 1, system 100 may include one or more user devices 120, one or more web servers 112, one or more advertiser servers 124, and an optimization system 122, any or all of which may be provided in communication with electronic network 101. Although not shown in FIG. 1, system 100 may include systems and methods for analyzing or valuating advertisements ("ads"), based on various combinations of advertising elements and content. Electronic network 101 may be, for example, a wired communication system, a wireless communication system, a local or wide-area network, the Internet, and/or any combination thereof.

The servers and computer systems of system 100 may be disposed in communication with each other via electronic network 101, or any other public or private network. User devices 120 may each interact with advertiser servers 124 and/or web servers 112 through computers or processors connected to electronic network 101, or via network-capable electronic devices such as personal digital assistants ("PDAs"), smartphones, mobile devices, Internet-enabled televisions, automobiles, or homes, or any other mobile or electronic device configured to access the Internet. The term "user," "customer," or "person," as used herein, may refer to any consumer, viewer, or visitor of a web page or site and can also refer to the aggregation of individual customers into certain groupings. References to customers "viewing" ads is meant to include any presentation, whether visual, aural, or a combination thereof.

As will be described in more detail below, a set of attributes or feature may be associated with each user of user device 120 in a searchable profile. The attributes may reflect the user's interests and incorporate characteristics that impact advertisement selection, purchasing, and other online behavior. Attributes may be created based on user data, such as impression history, click history, conversion history, demographic data, and/or interest data.

Consistent with embodiments of the present disclosure, system 100 may be configured to implement and execute the exemplary methods and features disclosed herein. For example, optimization system 122 may be configured to facilitate the optimization of advertisement selection and display based on historical data associated with a user, and also based on future predictions of the user's behavior. Optimization, as will be described later with reference to the accompanying drawings, may comprise optimizing a bid value of an advertisement based on features of a user, and by determining whether an advertisement should be displayed based on the optimized bid value. The optimized bid value may be the result of providing an advertisement influence function to a baseline bid value.

In some embodiments, user devices 120 may interact with web servers 112 and/or advertiser servers 124. Web servers 112 and/or advertiser servers 124 may also interact with optimization system 122. All such communication may be performed via electronic network 101. Electronic Network 101 may be, in some embodiments, the Internet, but may in other embodiments comprise any number and configuration of different types of networks, such as an intranet, a Local Area Network ("LAN"), a Wide-Area Network ("WAN"), a Metropolitan-Area Network ("MAN"), or the like. In some embodiments, web servers 112, advertiser servers 124, and/or optimization system 122 can be implemented by a single device or multiple devices.

In certain embodiments, web servers 112, user devices 120, optimization system 122, and advertiser servers 124 may each be an assembly of hardware, including a memory, a central processing unit ("CPU"), and a user interface. The memory may include any type of RAM or ROM used for storing, either permanently or temporarily, software modules or instructions for execution by the CPU. The memory may also include a tangibly-embodied non-transitory computer-readable storage medium, such as magnetic storage including floppy disk, hard disk, or magnetic tape; semiconductor storage such as solid state disk ("SSD") or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor ("DSP") hardware, or any other hardware capable of executing instructions. An optional user interface may be included with any of web servers 112, user devices 120, optimization system 122, and advertiser servers 124, and may include any type or combination of input/output devices, such as a display monitor, keyboard, or mouse.

Advertiser servers 124 may include any entities having online advertisements (e.g., banner ads, pop-ups, textual ads, video ads, etc.) desired to be delivered to online users. For example, advertiser servers 124 may have created advertisements relating to products or services marketable to one or more online users. Advertiser servers 124 may be configured to serve advertisements across web servers 112, for example, based on actions by user devices 120, and based on input from optimization system 122. The advertisements may be selected according to a bidding process, whereby various advertisers compete for placement of advertisements by submission of bid prices. Advertiser servers 124 may also be configured to serve ads based on contextual targeting of websites, search results, and/or user profile information. Advertiser servers 124 may further generate behavioral logs, leadback logs, click logs, action logs, conversion logs, and/or impression logs, based on users' interactions with, for example, web servers 112, such as by interactions with websites and ads running on web servers 112.

Optimization system 122 or Advertiser server 124 may include a graphical user interface ("GUI") whereby an advertiser may configure advertising campaigns, or may specify campaign specific information. Moreover, an advertiser may use the GUI to specify descriptions corresponding to particular advertisements. The GUI may also provide information for an advertiser regarding overall revenue, estimates of ad impacts, and past, current, or future potential bidding costs.

Figure 2:
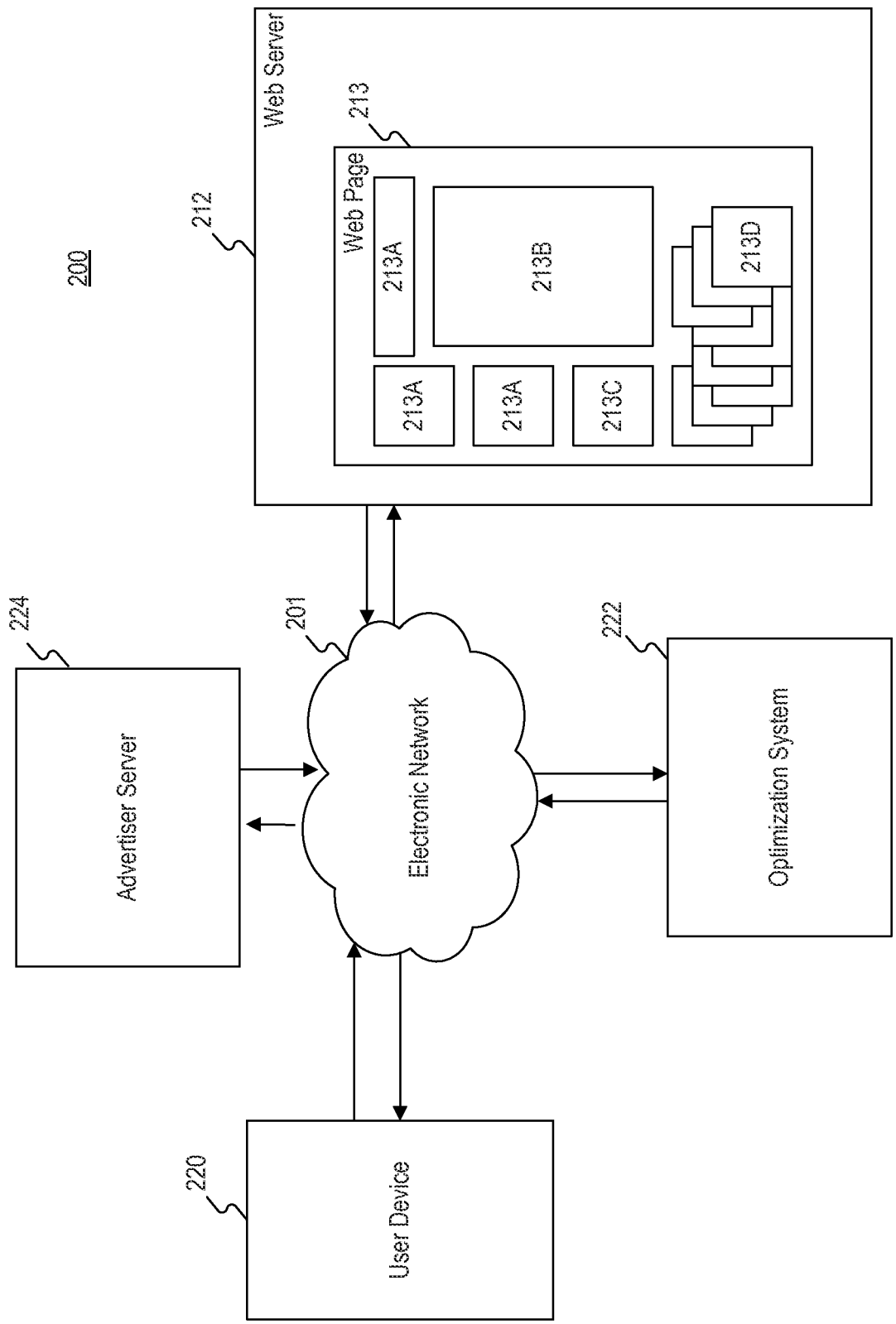
FIG. 2 is a diagram of an exemplary computerized system 200 for implementing embodiments consistent with the present disclosure.

FIG. 2 illustrates an exemplary computerized system 200, consistent with certain embodiments of the present disclosure. System 200 includes electronic network 201, web server 212, user device 220, and optimization system 222. User device 220 may communicate over network 201 with web server 212, to request a web page 213. The various components of system 200 may include an assembly of hardware, software, and/or firmware, including a memory, a CPU, and/or a user interface. Memory may include any type of RAM or ROM embodied in a physical storage medium, such as magnetic storage including floppy disk, hard disk, or magnetic tape; semiconductor storage such as SSD or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, DSP hardware, or any other hardware capable of executing software. An optional user interface may include any type or combination of input/output devices, such as a display monitor, keyboard, and/or mouse.

As shown in the exemplary embodiment of FIG. 2, web page 213 may contain a multitude of items including, for example, advertisements 213A, content 213B, videos 213C, and/or images 213D. As will be appreciated, various combinations of these items may be provided and these items may be arranged in various ways on web page 213.

Advertisements 213A may comprise, for example, text, static and/or dynamic images, hypertext (e.g., HTML or the like), interactive content (Adobe Flash, Java, etc.), and the like. Content 213B may also include, for example, electronic content such as text, static and/or dynamic images, hypertext, interactive content, e-commerce product offerings (e.g., offers to purchase clothing, books, travel, hotel reservations, etc.), and the like. As shown in FIG. 2, web page 213 may also contain videos 213C and/or images 213D, which may or may not be associated with advertisements 213A and content 213B.

As indicated above, other layouts, configurations, and types of data for web page 213 are possible. In addition, web page 213 may, in some embodiments, be another type of data sent to user device 220 over network 201 including, for example, an Adobe Flash application with dynamically-updated data (213A-213D).

In accordance with an example embodiment, when web server 212 receives a request from user device 220 over network 201 for web page 213, web server 212 may interact with advertiser server 224 to determine the appropriate configuration for items represented by 213A-213D in promotion slots or locations in the web page 213. Such configuration of items 213A-213D may be based on interaction between advertiser server 224 and optimization system 222, whereby appropriate bid values can be optimized for use by advertiser server 224. For example, optimization system 222 may determine, based on a state of a particular user viewing web page 213, that certain advertisements 213A should be embedded in promotion slot(s), that certain content 213B should be embedded in promotion slot(s), that one or more videos 213C should be embedded in promotion slot(s), and that certain pictures 213D should be embedded in promotion slot(s). Such selections can be performed based on a prediction by optimization system 222 that certain advertisements are more likely to result in a conversion of the advertisement impressions given the state of the user.

As shown in the example embodiment of FIG. 2, optimization system 222 may be implemented as a separate device or system from web server 212 and advertiser server 224. In such cases, optimization system 222 may communicate with web server 212 and advertiser server 224 over electronic network 201. In other embodiments, optimization system 222 may be co-hosted or implemented in the same device or system with advertiser server 224.

User device 220 may access web page 213 via web server 212, whereby a user of user device 220 can view particular advertisements and related contextual information. For example, a user of user device 220 may view advertisement 213A, triggering an impression of the advertisement for the user. Should the user purchase the advertised product, advertiser server 224 may record data concerning the conversion, which can then be used to maximize the expected discounted value of future sales of the product. Each potential customer of the product can be assumed to have a baseline likelihood distribution governing the future purchases of the product by the user.

This baseline likelihood distribution is capable of being influenced, however, based on the selection of certain advertisements. Moreover, the context of the advertisement can also influence the baseline likelihood distribution. For example, an advertisement may cause greater influence to the baseline likelihood distribution when viewed at 7:00 PM on a news website, as opposed to an 11:00 AM placement on a weather website. The state of the user can also provide an influence on the baseline likelihood distribution. As such, an optimal advertisement placement model can be created that governs the selection of advertisements, and may take into account a variety of features, such as the context of the advertisement as well as the current state of a user, in determining the proper advertisement to display, and particular advertisement policies can be created for particular users or groups of users based on the features or states. This in turn can influence bidding on opportunities to display messages through online bid exchanges or other forms of online and offline auction systems. Additionally, the optimal advertisement placement model can be used to calculate expected values resulting from future sales, where the future sales are governed by the baseline likelihood distribution as influenced by updated states or prior advertisement selections.

For example, suppose that a single user is accessing web page 213 via user device 220, and there is a choice of selecting advertisements A and B for use as advertisement 213A. Furthermore, assume the user can be exposed to an advertisement either in a situation that is in-context C to the product, or out-of-context O. If p denotes the baseline probability of purchasing the product prior to exposing the user to an advertisement, $p_{A,C}$ denotes the ad influence based on showing advertisement A in-context, and similarly for the other exposure combinations: $\{(A,O), (B,C), (B,O)\}$. Moreover, if q denotes the chance of consumer being in-context, a potential advertising policy is then to show advertisement A if in-context, and advertisement B if out-of-context. The likelihood of seeing a product purchase based on this policy may then be expressed as:

$$S+qp_{A,C}+(1-q)p_{B,O} \qquad (1)$$

That is, advertisers can attempt to maximize the sale of a product according to an appropriate advertisement placement model, i.e., the selection of advertisement A or B for each exposure opportunity C or O that maximizes the likelihood of seeing a product purchase.

The situation becomes more complex when there are multiple opportunities to show advertisements over time, the user may buy more than one product over time, and there are many possible different exposure contexts and many different advertisements. While it is unclear when the next opportunity to expose the user to an advertisement will arise, it can be presumed that these opportunities will follow sequentially. Stochastic dynamic programming can therefore be applied to determine the appropriate advertisement decision so that advertiser server 224 can select the appropriate action with respect to an advertisement bid.

Additionally, in online advertising, there can often be a high degree of correlation between who is seeing advertisements, and who is converting on these advertisements. This is not necessarily just because the advertisements are causing people to purchase a certain product, but also because advertising is often shown to people who are more likely to purchase products in general. On the other hand, not showing an advertisement may be considered a default option, and the value of not showing an advertisement is typically not taken into account in relation to the value of showing an advertisement. That is, typical systems do not account for a determination as to whether the reward for displaying an advertisement sufficiently justifies the placement of a bid.

This may additionally depend on the quantity of advertisements that are shown and the time periods when these advertisements are displayed.

The impact of showing an advertisement in comparison to not showing an advertisement can be explored by controlling the time periods for advertisements. Specifically, if the time period is shortened, then an increased number of data points can be observed that reflect when a user has not seen an advertisement. Relating that to the number of conversions generated during the advertisement viewing time periods, as well as the non-advertisement viewing periods, may then provide information to what extent seeing an advertisement impacts the purchase probability. Additionally, this data can also be used to determine the impact on the purchase probability based on the forward impact of seeing an advertisement, beyond the time period associated with the advertisement.

In certain embodiments, the influence of an advertisement can be considered by generating a collection of samples of both positive and negative data points regarding a user's interactions according to the displaying, or not displaying, of an advertisement. First, the positive samples (e.g., specific conversions or other such transactions involving, for example, advertisement 213A) that occurred during a particular time interval corresponding to an advertisement can be identified. Based on these positive samples, features of the user can be determined for the point of time immediately prior to the action. These features can include advertisement specific features such as count of impressions in the last day, and so forth. Next, random users can be selected for a variety of specific times. The times can denote fictional action events, and may be drawn from estimates of time of day or day of week action distributions that have been estimated. Features can then be calculated for these fictional events, and the data set resulting from the fictional events may be used as inputs to the functions that can calculate the appropriate ad influence to be applied to the baseline likelihood distribution and to ultimately influence the bid value. Thus, routines can be created to identify relationships between the advertisement specific features and the likelihood of acting on a part of a user based on features specific to the user.

In order to capture this ad influence, state variables can be introduced that mathematically capture how ad influence enters into the purchase likelihood function that describes how and when the user will make future purchases. Examples of such features reflected by the state variables may be created by receiving user event data, and parsing the user event data by one or more of the following:

Extracting online interests from web logs, demographic and interest data gathered through data sharing arrangements with partners, prior purchase data, and geographic and other user agent data.

Recording a user's advertisement engagement, including clicks, video views, or mouse hovering actions over a particular area of an advertisement space.

Recording a user's visits to an advertiser's website or particular sections of an advertiser's website.

Counting the number of times a user was exposed to a particular advertisement in total, for the current month, for the current week, for the current day, for the current hour, or for the current session, as well as functional forms to capture effect of decay, persistence of repeatedly seeing ads through time, and through time series aggregation functions as well as potential transformation functions such as Fourier, Z, and wavelet.

Capturing further granularity through contextual relevance of the medium where the advertisement was shown, and where in the medium the advertisement was shown (e.g. above or below the viewable portion of the browser window, top of the screen), and time of the advertisement exposure.

Counting an exposure amount when an advertisement is treated as a member of one or more groups of related advertisements. For instance, a count of display banner exposures if an advertisement is part of a particular display banner.

Counting various forms of engaging with the advertisement, such as clicking on a display banner and viewing a video or calling the advertiser, as well as indirect forms such as immediately searching for information related to the advertisement, such as brand, product name, or product reviews, or immediately navigating to the advertiser's website or other content related to the advertisement following exposure.

In certain embodiments, advertisers, publishers, and/or ad network facilitators may assign a web cookie and/or unique user ID to each computer or Internet-enabled device identified as visiting a site in the ad network, enabling capturing of the user event data for purposes of creating a central feature set. In one embodiment, cookies may allow tracking of a user across websites in the ad network by identification of the assigned user ID, and may enable each transaction associated with the assigned user ID to be logged with an associated timestamp. For example, cookies stored locally on a user's computer may be accessed to identify the user and to determine the last time that the user viewed the advertisement and/or a web page. In addition, in instances when a cookie is unavailable, a virtual cookie may be used. A virtual cookie may be derived from available information such as the user's IP address, browser type, geographic location, connection speed, or any other accessible and appropriate session level data. In certain embodiments, data may be obtained for each user, which represents the user's tendency to return to a specific web site in a given period of time. This data may be initially generated using estimated figures based on known user attributes. The estimated figures may be modified over time using user viewing logs. User viewing logs may be created by storing the viewing patterns of a user over an extended period of time.

The user event data may be stored in a central location, for example, at advertising server 224. Based on the stored user event data, additional web content may be fetched by advertising server 224, and contextual tags associated with a URL where a transaction occurred may be incorporated into user event data. The user event data may then be analyzed, and for a particular product in interest, relevant feature sets may be extracted by determining the various users who have purchased the particular product.

According to the identified feature sets for the users, an advertiser may then attempt to determine how an advertisement may potentially influence the future purchasing by the user. However, the functional form of the likelihood distribution that governs future sales for a user is generally not known, and representations of a certain input state and a corresponding output optimal value may not be available. A parametric model may therefore be developed for this distribution based on the analysis of data involving past purchasing decisions, as well as data representing the various features of users, such that the appropriate ad influence can be calculated as set forth above. In certain embodiments, a single model may be created for all users based on the data, where the users are differentiated in the model based on the given state and the features of the users. However, it will be appreciated that this is not restricted to a single model, and in certain embodiments a model can be estimated for each user. The model can then provide a distribution for a user based on the known attributes or features of the user.

For example, an optimal value function can be considered for providing a suitable distribution given this situation. Let $V^*$ denote the optimal value function, $r_t$ the reward, $\omega_t$ the advertisement, $c_t$ the cost of showing the advertisement, d the one period discount factor, and $S_t$ the state of information, all at time t. Dynamic programming can be applied, where the optimal value may be calculated by starting at the end and then recursively going backwards one period at a time until present time is reached. As such, in this embodiment, the value equation as follows:

$$V^*(S_t) = \max_{\omega_t} E[r_t(\omega_t) - c_t(\omega_t) + dV^*(S_{t+1})|S_t, \omega_t] \quad (2)$$

That is, the optimal value at time t of a user who has state $S_t$ is the advertisement that maximizes the expected value of the time t reward which depends on the advertisement, the cost of showing the advertisement, and the discounted value of the optimal value function at time t+1. It will be appreciated that the expected value as the reward during time t can be random, and that the information state can change during the period in ways that are unknown. In the right side of equation (2), the $r_t(\omega_t) - c_t(\omega_t)$ expression can be used to represent the difference between the reward and the cost at time t given a particular choice of an advertisement. Moreover, the $dV^*(S_{t+1})$ expression can represent the discounted value of the optimal value function. Finally, $E[r_t(\omega_t) - c_t(\omega_t) + dV^*(S_{t+1})|S_t, \omega_t]$ can denote the expected value operator, which depends on the current state and the choice of advertisement. It will be appreciated that while equation (2) is written in terms of a discrete time process, this is for exemplary purposes only, and that continuous time process modeling may also be utilized in estimating and valuating the equation.

The optimal value function presented in equation (2) can represent the optimal value of a user, where the user is represented through the state variable $S_t$, when viewed across all advertisers. However, a number of functions of the optimal value function are not known. Specifically, the functions $V^*$, $c_t$, and $r_t$ are not known, and need to be estimated such that appropriate use may be made of the value function. Accordingly, approximations of these functions may be determined. Once the approximations for these functions are devised, the choice of the optimal advertisement can be given by:

$$w(S_t) = \operatorname{argmax}_{\omega_t} E[\tilde{r}_t(\omega_t, k) - \tilde{c}_t(\omega_t, k) + d\tilde{V}^*(S_{t+1}, k)|S_t, \omega_t] \quad (3)$$

In equation (3), the terms inside the expected value operator, specifically $\tilde{r}_t(\omega_t, k) - \tilde{c}_t(\omega_t, k) + d\tilde{V}^*(S_{t+1}, k)$, can represent the best estimates of the reward, cost, and discounted present value of the next period optimal value function. The argmax term may represent the selection of the advertisement that maximizes the expected value. Furthermore, in the equation, k may represent a vector of parameters which can be used to describe each function, and can be determined through separate modeling exercises. It will be appreciated that while equation (3) uses a common parametric vector in all three functions, this is for example purposes only, and in certain embodiments different parametric vectors can be used in combination with the functions.

It will be further appreciated that the state in the next period of equations (2) and (3) if we show the advertisement may be different to the state in the next period if we do not show the advertisement. For example, suppose the purchase probability $p_t$ is governed by the following process:

$$p_t = p_0 + \delta(1 - e^{-\alpha m_t}) \quad (4)$$

Where $p_0$, $\delta$, $\alpha$, $m_t$ are the initial purchase probability, maximum ad influence, advertisement count impact, and number of advertisements seen by the user up to time t, respectively. Moreover, a likely decay of the advertisement impact may be modeled, where $m_t$ may follow a decay process as follows:

$$dm_t = -\gamma m_t d_t + f(n_t) \quad (5)$$

where $n_t$ is 1 if the user saw an advertisement at time t and zero otherwise, and f is some suitable non-negative function. The function may represent the changing state values based on the passage of time, and may be used in combination with similar time series models, such as auto regressive integrated moving average (ARIMA) time series models to represent how features and states may change over time.

A variety of methods can be used to derive the various functions necessary for selecting the optimal advertisement. In one embodiment, each function in the value equation can be approximated separately such that the bid optimization may be carried out. In another embodiment, a Q-Learning process may be employed. For example, the following function can be used:

$$Q^*(S_t, \omega_t) = E[r_t(\omega_t) - c_t(\omega_t) + dV^*(S_{t+1})|S_t, \omega_t] \quad (6)$$

That is, a Q function can be introduced that captures all the details on the right expression of the optimal value function. In this manner, the optimal advertisement may be determined, given a particular state, according to the following:

$$w(S_t) = \operatorname{argmax}_{\omega_t} \tilde{Q}(S_t, \omega_t, k) \quad (7)$$

An appropriate bid value corresponding to the advertisement may then be calculated for submission to the bid exchanges. The term "bid," in some embodiments, is used in the context of a market clearing/auction environment or application. The bid price for each promotion can be used to bid on the available promotion slots ("impression set requests"). In some embodiments, the highest bid for each promotion slot will win the auction, meaning that the promotion associated with the bid will be displayed. This has the effect of showing those promotions with the highest engagement rate more often, because they are more likely to win that auction. However, it will be appreciated that there are other possibilities regarding use, adjustment, and bidding for these prices.

To obtain a suitable bid value for an advertisement that can be used in an exchange context, a maximum value willing to be paid to show the advertisement may be calculated. This value $\lambda(\omega)$ is the solution to:

$$E[r_t(\omega) - c_t(\omega) + dV_\omega^*(S_{t+1})|S_t, \omega] - \lambda(\omega) = E[r_t(\bar{\omega}) + dV_\omega^*(S_{t+1})|S_t, \bar{\omega}] \quad (8)$$

Specifically, the bid value may represent a cost where it becomes indifferent between buying and not buying the right to show the advertisement. Rearranging this equation shows that the maximum bid may be given by the difference in value of showing the advertisement versus not showing the advertisement:

$$\lambda(\omega, S_t) = E[r_t(\omega) - c_t(\omega) + dV_\omega^*(S_{t+1})|S_t, \omega] - E[r_t(\bar{\omega}) + dV_\omega^*(S_{t+1})|S_t, \bar{\omega}] \quad (9)$$

As expressed above in equation (9), ad influence is represented through the difference between the value of showing the advertisement and the value of not showing the advertisement may be captured, and specifically accounts for the situation that the reward may be non-zero even if an advertisement is not displayed. In other words, a reward may be generated even in instances where an advertisement is not displayed. The expression also may incorporate explicitly the notion of an individual advertisement for a single user, and also the current state which includes the representation of the context of where the advertisement is shown.

As shown above for equation (6), a similarity exists between Q representation and the bid value represented by equation (9). In particular, the bid value may be considered as the difference between showing the advertisement and following the optimal policy with respect to this one advertisement, which in the decomposable sense may be written as $Q^*(S_t,\omega_t)$, and not showing the advertisement and then following the optimal policy, which may be written as $Q^*(S_t,\overline{\omega}_t)$.

However, as noted above, the various functions, such as the Q function, may need to be estimated. Such information may be generated through the building of a simulation environment, where a model of user features may be generated according to user event data, as well as by using online and offline simulation processes. Simulation processing can potentially involve both explicit online exploitation/exploration steps as well as offline simulation steps. In certain embodiments, modeling and function estimation may be performed offline. However, in additional embodiments, these functions may be performed in an online environment, depending on need and technological difficulty. Moreover, the features needed for the scoring functions and the evaluation of subsequent functions such as the purchase likelihood function, any cost function estimates, ad engagement function estimates, and any heuristic functions evaluated to promote exploration may be updated and calculated in real time as new information becomes available (e.g., new user features) or a new advertisement impression opportunities arise.

Offline simulation steps may require the specification of a probabilistic representation of the overall system. In particular, this means specifying the distribution governing future rewards $r_t$ and how these rewards may be influenced by certain advertisements. As shown earlier, the reward distribution can be considered as being defined by a baseline likelihood distribution and an advertisement influence. The advertisement influence may depend on the context of where the message is shown, and may be calculated according to data analysis of currently running advertisements. However, for new advertisements, and also for advertisement campaigns running for a short period of time, there may be a significant amount of uncertainty around the exact reward distribution.

Therefore, to attempt to reduce the uncertainty concerning the reward distribution, online experimentation may be conducted, where the advertisement is shown to users. Moreover, to reduce the associated learning cost, historical data may also be used to estimate a distribution that describes the uncertainty around the reward distribution, which may then be used in an offline simulation. This offline simulation may be coupled with additional online tests to effectively determine the optimal bidding policy.

It will be appreciated that the likelihood that an average user makes a purchase may be very small. As such, there may be relatively few observable purchase events. However, as set forth above, there will generally be certain features that are important, such that when a user possesses these features, the likelihood of a purchase becomes much higher. Moreover, the likelihood of a user obtaining such features may be significantly higher than the same user directly making a purchase. The relevance here is that the acquisition of such features should be much simpler to estimate as they are not as sparse as purchasing actions by the user. Moreover, conditioned on such features, the purchase likelihood should also increase substantially. As such, a distribution governing such features, and also how advertisements influence such features, may be estimated.

As discussed earlier, an optimal bid value is one that results in an indifference between showing an advertisement, and not showing an advertisement. The optimal bid value should incorporate the expected value of showing an advertisement, where the expected value may reflect any ad influence that would be incurred through showing the advertisement, based on the features of a user, which may require determining the appropriate ad influence to apply. In one embodiment, the information needed for determining the appropriate optimal bid value can be determined using a Q-Learning approach. The solution may be provided by selecting the largest bid value from the set of bid values generated through the evaluation process. The bid value may be defined as the difference in Q values of showing and not showing the advertisement, as discussed above in equation (9). As such, let $u \in \{\omega,\overline{\omega}\}$, then:

$$Q^*(S_t, u) = E\left[r(S_{t+1}, u) - c(S_{t+1}, u) + d \min_{v \in \{\omega,\overline{\omega}\}} Q^*(S_{t+1}, v)\right] \quad (10)$$

A linear parametric architecture for Q may then be chosen as:

$$\tilde{Q}(S,u,r) = \varphi(S)' r_u \quad (11)$$

Therefore, the bid value for an individual advertisement may then be determined by:

$$\lambda = \tilde{Q}(S,\omega,r) - \tilde{Q}(S,\overline{\omega},r) \quad (12)$$

Based on the above equations, parameters may be chosen to appropriately represent the most important features that predict and influence future consumption. These parameters may be estimated, such as by applying Q-Learning methods such as a projected iteration method. Additionally, features may be introduced to represent an opportunity value caused by uncertainty of the parameters representing the reward distribution. That is, the expected values used in calculating the appropriate bid value are effectively the current best guess given the amount of information observed, and an amount of uncertainty may exist. As such, the ad impact may be much higher or lower than the calculated expected value, and an exploration value may be calculated to express this uncertainty.

This value can be captured heuristically by creating a function that decreases as the variance of the estimates decreases. In one embodiment, the reward distribution may be calculated based on the historical event data. This distribution may incorporate both general user features as well as features specifically representing views of a particular advertisement. In addition, the uncertainty of the parameters representing the message impact features may be captured, which may represent the opportunity of learning by showing the advertisement, i.e., the uncertainty will only be reduced when we show the advertisement.

Therefore, the uncertainty can be modeled to represent how showing an advertisement may reduce the uncertainty around the current estimate of the advertisement specific parameters, and secondly, how reducing this uncertainty may impact the reward distribution, and finally, how this impact may change the overall reward. For example purposes, consider again a simple purchase probability model:

$$p_t = p_0 + \delta(1 - e^{-\alpha m_t}) \quad (13)$$

where $\delta$, $\alpha$ are parameters that reflect the importance of the advertisement specific feature $m_r$. Assuming that these are deterministic, the value of showing one advertisement, if the user previously had not seen the advertisement, may be represented as:

$$\delta(1-e^{-\alpha}) \quad (14)$$

This equation follows from subtracting the expected value when showing the model from the expected value if not showing the model:

$$p_0+\delta(1-e^{-\alpha 1})-(p_0+\delta(1-e^{-\alpha 0}))=\delta(1-e^{-\alpha 1}) \quad (15)$$

On the other hand, if these variables were to actually change in a direction that increased the value of showing a message, then that may potentially increase the overall value. The model may then be represented as:

$$\delta(1-e^{-\alpha})+f(\sigma_{\alpha,\delta}) \quad (16)$$

where $\sigma_{\alpha,\delta}$ represents the variance-covariance matrix of the estimates of $\delta$, $\alpha$ and f is some function that need to be estimated. The first term of the above equation represents the expected incremental value of showing the advertisement, relative to not showing the advertisement, while the second term represents the value of exploring further in case the actual advertisement impact is higher than our current estimate.

In an alternative embodiment, the parametric form of the value function may be directly solved with respect to $u \in \{\omega, \overline{\omega}\}$. The bid value may then be provided as:

$$\lambda = \tilde{V}(S,\omega,r) - \tilde{V}(S,\overline{\omega},r) \quad (17)$$

i.e. the difference between showing and not showing the advertisement now, and subsequently following the optimal strategy.

Figure 3:
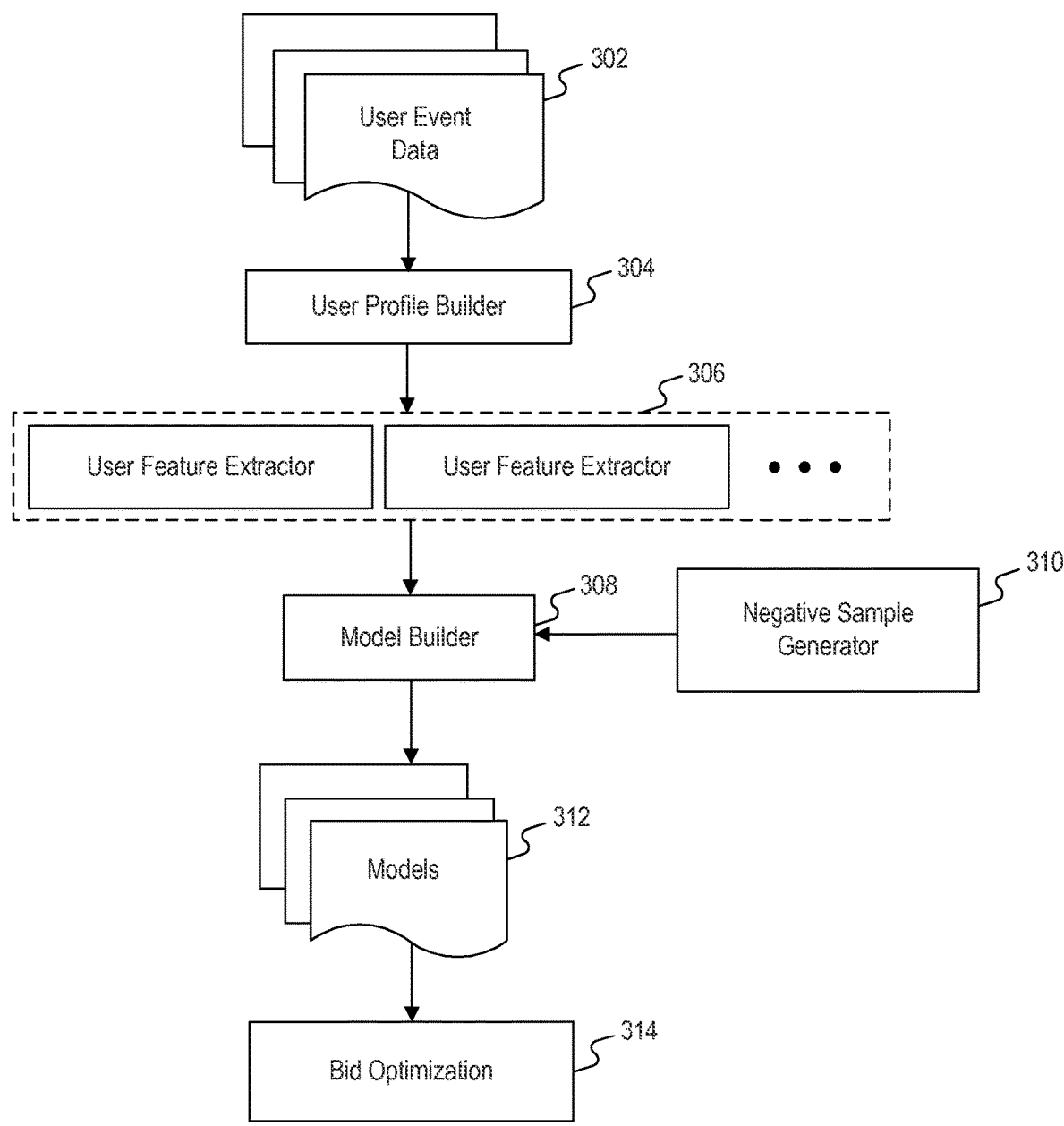
FIG. 3 is a diagram of an exemplary arrangement of modules for implementing embodiments consistent with the present disclosure.

Referring now to FIG. 3, an exemplary system 300 is shown that receives user event data 302 from various entities (such as those shown in system 100 of FIG. 1), based on user profiles, cookie data, and/or any other files storing users' interaction with the Internet, advertisements, and/or websites. User event data 302 may be received at, for example, optimization system 112. For example, various data logs may be received from web servers 112 or advertiser servers 124, including: behavioral logs, leadback logs, click logs, action logs, and/or impression logs. User event data 302 may be based on, e.g., impressions, events, conversions, and/or behavioral logs, and may include information such as a user ID, date and timestamp, URL, and frequency of visits. It will be appreciated that any additional data sources or logs may be accepted, including proprietary logs from various ad-serving services, advertisers, ad agencies, or data providers.

Information from these and other input logs may be incorporated by using parsing adapters. For differentiating various users, it may be desirable for all of the different logs to have a unique identifier or user ID that is either unique across all logs or mappable to other unique user IDs. In one embodiment, each of the logs may include one field with a user ID, and additional fields with data describing the characteristics and/or properties of any event, such as a page view, click, or purchase. The logs may also include a timestamp of the event, and a referring URL, if relevant.

Based on the received user event data, a user profile builder module 304 may reorder the event data such that all event data associated with a particular user ID is stored in an individual user profile corresponding to the user ID. Such user profiles may be updated over time by receipt of additional data via additional user event data.

The user profiles generated by profile builder module 304 may then be used to identify key features corresponding to products that an advertiser may wish to advertise. For example, users who have made purchases of the product may be identified from the logs used to generate the user profiles, and a number of positive test cases may be gathered to create a representative feature set to correspond to this particular product.

Upon generating the user profiles, one or more user feature extractor modules 306 may be used for extracting relevant features from the profiles for use in modeling future behavior with respect to a particular product. These key features attempt to accurately describe the users who have purchased the product in the past, and also provide relevant information concerning predictable future behavior for the user, such as the user's desires or purchase interests.

Specifically, for each product that has been purchased, the user's features immediately prior to the purchasing action can be extracted. Additionally, this can be used to distinguish features that are occurring as part of the purchase transaction from features occurring prior to the user engaging in the actual purchase. In certain embodiments, a time window may be defined, and features that fall within the defined time window may be extracted. Such a time window may be defined as minutes prior to the purchasing action, to hours prior to the purchasing action. Alternatively, the time window may be utilized to specify that event data occurring during the time window should not be considered for purposes of feature extraction. Moreover, the extracted feature set may also include features that describe when the particular user may be observed again in the future, both in regards to timing and visitation frequency, as well as type of content the user is generally visiting.

Because important features may change based on products or time, the exact feature set extracted from the user profiles may include a broad set of features, and such features may be tuned by being updated according to new user event data, and based on time series functions. For example, routines may systematically trawl through the user event data to identify particular data fields that might be of interest based on various feature selection criteria that may be received by an advertiser, such as chi square and mutual information. For example, based on feature selections received over time, the relevant feature list may be narrowed down to few hundred in one embodiment. These features will generally be represented in terms of ARIMA time series, although allowances will be made to include static features to capture for instance location.

Several of these features may relate to advertisements from the particular advertiser seen by a user in the past, both in terms of the particular advertisement type, as well as the total number of advertisements. Moreover, certain features may be included to capture the type of content the user was browsing when seeing the message, and also time of day/time of week, or whether message occurred prior to a particular event such as Mother's day or Christmas. Additional features may capture the likelihood that a user will actually notice the advertisement, which may in turn depend on the associated website, content on the website, time of advertisement placement or time of day, website placement location, advertisement message size, or level of advertisement interactivity. The feature sets extracted by user feature extractor module 308 may then be provided to model builder module 308 for purposes of generating a model that can be used to predict future purchasing behaviors of users, based on the feature sets. In one embodiment, the feature sets generated by user feature extractor module 306 may be represented by a table, where each row of the table corresponds to a particular user ID, and each column of the table corresponds to a feature.

For modeling purposes, negative samples may also be generated such that typical user features common to most users can be eliminated, such that features that characterize an impending purchase are emphasized. Negative sample generator module 310 may generate negative samples for providing to model builder module 308. Negative sample generator module 310 may create such negative samples by estimating a time of day or day of week probability distribution to capture when purchases tend to happen. The estimated probability distribution can then be used to periodically draw random time periods (i.e., representing fictitious action events or purchase events) until sufficient negative samples are generated. For each of the negative samples, a random user may also be selected. Therefore, the fictitious time periods may represent the non-purchase time of this fictitious user, and the features for this fictitious user may be generated in a similar fashion as the features produced by user feature extractor module 306.

Model builder module 308 may take the various feature sets received from user feature extractor module 306 and negative sample generator 310, and may generate one or more models 312 that can be used to find a function and associated parameters for the function for calculating a probability that a user is likely to make a purchase in the future. In one embodiment, model builder module 308 may take the table of features, and may process the table using a variety of data mining algorithms. These algorithms may include, but are not limited to, naïve Bayes, support vector machines, various decision tree algorithms such as Gradient Boosting Machines and Random forest, and neural networks. The output of these algorithms is a model that may be used to score users based on the features of the users. The score of a user may then be used by bid optimization module 314 to influence the bid value by enabling an advertiser to determine whether a particular advertisement is likely to affect the particular user.

Specifically, bid optimization module 314 may calculate a purchasing probability estimate concerning a particular user. This may be based on generating a function that converts the score of the user into a purchasing probability estimate based on historical data of the user. Such a purchase likelihood function may be created by designating a time period from a certain number of days prior to a purchase, creating a model based on data occurring prior to the time period, and then score users with the latest information at that time period based on the model. Then, by observing purchases that occur as the time period moves toward the present time, a dataset can be generated that links user scores to observed purchases. This provides a dataset can be used to estimate the user purchase likelihood function. The user purchase likelihood function can then be used by bid optimization module 314 to influence the reward function used in the value function.

As an example of the relationship between the reward and the purchase likelihood function, the purchase likelihood function can be used to calculate the probability of a user making a purchase at a particular time in the future. This probability may be denoted as $p_r$. The reward function can describe how much may be earned in the future. For instance, if the user makes a purchase, and the product sold has a value of $10, then the expected reward may be $10$p_r$. In contrast, if the user does not make a purchase, then the reward may be considered zero.

In one embodiment, a cost margin may also be estimated and applied in the value function. The cost margin may be used to offset the value and may enable an advertiser to determine whether the selection of an advertisement would be beneficial. Such a cost may be estimated according to a similar process as the estimation used for the reward. In certain embodiments, however, the cost may be represented as simply zero, as the cost may be internalized as part of the bid price as opposed to representing the cost as a separate element in the value function.

Finally, bid optimization module 314 may calculate an exploration value expressing the uncertainty of the estimates used in the parameters representing the reward distribution. Based on the calculated exploration value, bid optimization module 314 may calculate an appropriate bid price for an advertisement that includes the appropriate reward, the amount of ad influence, and the exploration value used to guide further exploration.

The various components and modules of system 300 may include an assembly of hardware, software, and/or firmware, including a memory, a CPU, and/or a user interface. Memory may include any type of RAM or ROM embodied in a physical storage medium, such as magnetic storage including floppy disk, hard disk, or magnetic tape; semiconductor storage such as SSD or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, DSP hardware, or any other hardware capable of executing software. An optional user interface may include any type or combination of input/output devices, such as a display monitor, keyboard, and/or mouse.

Figure 4:
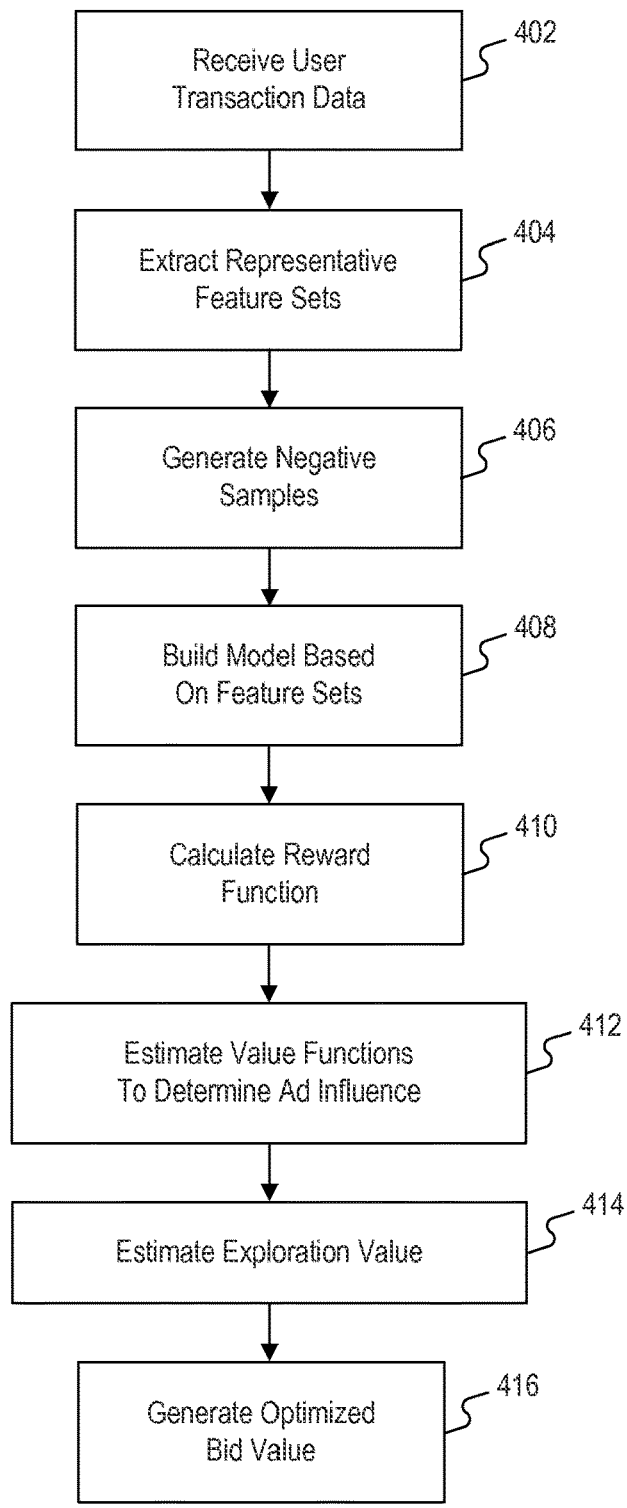
FIG. 4 depicts a block diagram of an exemplary method for generating an optimized bid value, consistent with embodiments of the present disclosure.

As will be appreciated, the exemplary embodiment 300 of FIG. 3 may be used to perform any combination of methods for generating optimized bid values. One such method is the exemplary method 400 depicted in FIG. 4 for optimizing advertising spending using a user influenced advertisement policy.

As shown, method 400 may include receiving user transaction data (step 402) from one or more web servers, where the user activity or event data may include details such as user IDs, details of a transaction, timestamps, etc. The user transaction data may be stored in a central server. Upon receiving the transaction data, certain users associated with a purchasing action for a product may be identified, and features for the users at a point in time prior to the purchase may be extracted as a representative feature sets (step 404). For example, user profile builder module 304 and user feature extractor module 306 may be used to generate feature sets for each user profile. Method 400 may further include generating one or more negative samples, whereby certain users are selected as fictitious nonpurchasers, and features of the users are collected to represent those present for nonpurchasing users (step 406). Method 400 may then build a model based on the feature sets (step 408), where features common to users may be distinguished from features that characterize a purchase, based on the negative samples.

The models may then be used to score users on the identified feature sets, and to calculate a reward function based on the scores (step 410). Next, method 400 may include estimating value functions to determine an appropriate ad influence, which may represent the difference in the value of showing a particular advertisement and the value of not showing the advertisement, given the feature sets designated in the model (step 412). Method 400 may then estimate an exploration value according to a heuristic function, which may express the uncertainty of the parameters used in calculating the reward function (step 414). Finally, method 400 may generate a bid value representing a maximum value for an advertisement based on the calculated reward function, the estimated ad influence value function, and the estimated exploration value (step 416). Steps 410-416 may be performed by, for example, bid optimization module 314.

In this disclosure, various embodiments have been described with reference to the accompanying drawings and embodiments. It will, however, be evident that various modifications and changes may be made thereto, and additional embodiments may be implemented, without departing from the present disclosure. The specification and drawings are accordingly to be regarded in an illustrative rather than restrictive sense.

For example, advantageous results may still be achieved if steps of the disclosed methods were performed in a different order and/or if components in the disclosed systems were combined in a different manner and/or replaced or supplemented by other components. Other implementations are also within the scope of the present disclosure.

Therefore, it is intended that the disclosed embodiments and examples be considered as exemplary only, with a true scope of the present disclosure being indicated by the following claims and their equivalents.

What is claimed is:

1. A computer-implemented method for generating an optimized bid value for an online advertisement relating to a product, the method being implemented with at least one optimization system and at least one advertiser system, the method comprising:
   receiving, at an optimization system from an advertiser system, information about online activity by a plurality of users, the information being obtained through one or more virtual cookies corresponding to a geographic location and connection speed of one or more of the plurality of users and including a user ID associated with each of the plurality of users;
   extracting, at the optimization system, a feature set and a state corresponding to purchasing users, the purchasing users being a subset of the plurality of users who purchased the product;
   generating, at the optimization system, a model that represents the extracted feature set and one or more advertising policies of the purchasing users, based on the extracted data;
   calculating, at the optimization system, a reward function according to the generated model;
   generating, at the optimization system, an optimized bid value for the online advertisement according to the calculated reward function, the optimized bid value comprising a value representing the difference between a value of displaying the advertisement and a non-zero value of not displaying the advertisement;
   determining, at the optimization system, which advertisement from a set of advertisements to present, based on the at least one optimized bid value; and
   sending, over a network by the optimization system, information related to the determined advertisement to the advertiser system with instructions to present the determined advertisement to one or more of the purchasing users and further manipulating a promotion slot corresponding to the state of the one or more of the purchasing users in a web browser via a web server.

2. The computer-implemented method of claim 1, further comprising organizing the information about online activity according to user ID such that features common to a user ID are grouped together.

3. The computer-implemented method of claim 1, wherein the reward function is calculated according to a purchase likelihood function, the purchase likelihood function representing the likelihood of one or more purchasing users purchasing the product based on the extracted feature set.

4. The computer-implemented method of claim 1, wherein generating the model further comprises generating a negative feature set for distinguishing features that characterize a purchase from features common to the plurality of users.

5. The computer-implemented method of claim 1, wherein the optimized bid value is generated according to estimated parameters representing the importance of important features from among the extracted feature set.

6. The computer-implemented method of claim 5, wherein the estimated parameters are estimated according to a Q-Learning process.

7. A system for generating an optimized bid value for an online advertisement relating to a product, the system comprising at least one optimization system and at least one advertiser system,
wherein the optimization system comprises:
   a computer-readable storage medium that stores a set of instructions; and
at least one processor configured to executed the stored set of instructions, the execution of the set of instructions causing the at least one processor to:
   receive, from the advertiser system, information about online activity by a plurality of users, the information being obtained through one or more virtual cookies corresponding to a geographic location and connection speed of one or more of the plurality of users and including a user ID associated with each of the plurality of users;
   extract a feature set and a state corresponding to purchasing users, the purchasing users being a subset of the plurality of users who have purchased the product;
   generate a model that represents the extracted feature set and one or more advertising policies of the purchasing users, based on the extracted data;
   calculate a reward function according to the generated model;
   generate an optimized bid value for the online advertisement according to the calculated reward function, the optimized bid value comprising a value representing the difference between a value of displaying the advertisement and a non-zero value of not displaying the advertisement;
   determine which advertisement from a set of advertisements to present, based on the at least one optimized bid value; and
   send, over a network, information related to the determined advertisement to the advertiser system with instructions to present the determined advertisement to one or more of the purchasing users and further manipulate a promotion slot corresponding to the state of the one or more of the purchasing users in a web browser via a web server; and
wherein the advertiser system comprises:

a computer-readable storage medium that stores a set of instructions; and at least one processor configured to executed the stored set of instructions, the execution of the set of instructions causing the at least one processor to:

send, to the optimization system, information about online activity by a plurality of users, the information including a user ID associated with each of the one or more purchasing users;

receive information related to the determined advertisement and the instructions to present the determined advertisement to the one or more purchasing users via a web server; and provide instructions to the web server to present the determined advertisement to the one or more purchasing users.

8. The system of claim 7, wherein the at least one processor is further configured by the set of instructions to organize the information about online activity according to user ID, such that features common to a user ID are grouped together.

9. The system of claim 7, wherein the reward function is calculated according to a purchase likelihood function, the purchase likelihood function representing the likelihood of one or more purchasing users purchasing the product based on the extracted feature set.

10. The system of claim 7, wherein to generate the model the at least one processor is further adapted by the set of instructions to generate a negative feature set for distinguishing features that characterize a purchase from features common to the plurality of users.

11. The system of claim 7, wherein the optimized bid value is generated according to estimated parameters representing the importance of important features from among the extracted feature set.

12. The system of claim 11, wherein the estimated parameters are estimated according to a Q-Learning process.

13. A computer-readable storage medium that stores instructions executable by an optimization system including at least one processor to perform a method comprising:

receiving, at the optimization system from an advertiser system, information about online activity by a plurality of users, the information being obtained through one or more virtual cookies corresponding to a geographic location and connection speed of one or more of the plurality of users and including a user ID associated with each of the plurality of users;

extracting, at the optimization system, a feature set and a state corresponding to purchasing users, the purchasing users being a subset of the plurality of users who purchased the product;

generating, at the optimization system, a model that represents the extracted feature set and one or more advertising policies of the purchasing users, based on the extracted data;

calculating, at the optimization system, a reward function according to the generated model;

generating, at the optimization system, an optimized bid value for an online advertisement according to the calculated reward function, the optimized bid value comprising a value representing the difference between a value of displaying the advertisement and a non-zero value of not displaying the advertisement;

determining, at the optimization system, which advertisement from a set of advertisements to present, based on the at least one optimized bid value; and sending, over a network by the optimization system, information related to the determined advertisement to the advertiser system with instructions to present the determined advertisement to one or more of the purchasing users and further manipulating a promotion slot corresponding to the state of the one or more of the purchasing users in a web browser via a web server.

14. The computer-readable storage medium of claim 13, wherein the method performed by the at least one processor further comprises organizing the information about online activity according to user ID such that features common to a user ID are grouped together.

15. The computer-readable storage medium of claim 13, wherein the reward function is calculated according to a purchase likelihood function, the purchase likelihood function representing the likelihood of one or more purchasing users purchasing the product based on the extracted feature set.

16. The computer-readable storage medium of claim 13, wherein generating the model further comprises generating a negative feature set for distinguishing features that characterize a purchase from features common to the plurality of users.

17. The computer-readable storage medium of claim 13, wherein the optimized bid value is generated according to estimated parameters representing the importance of important features from among the extracted feature set.

18. The computer-readable storage medium of claim 17, wherein the estimated parameters are estimated according to a Q-Learning process.

* * * * *